April 22, 1941.    H. F. WATERS    2,239,133
METHOD FOR FORMING CLOSURES
Filed July 2, 1937
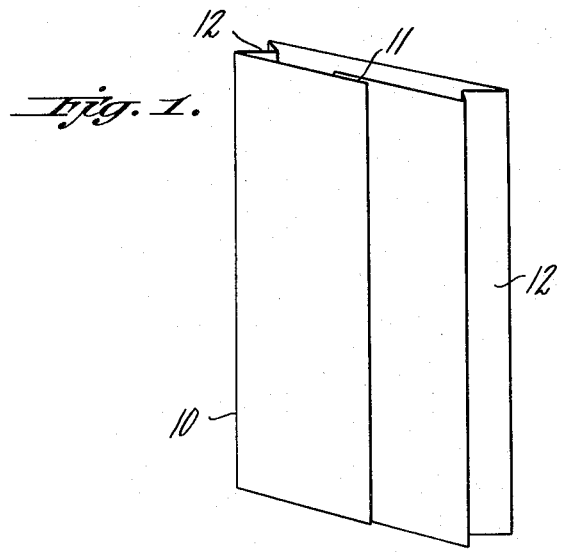
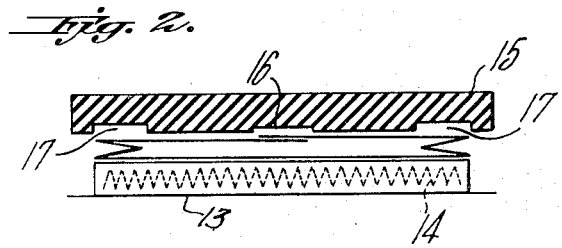
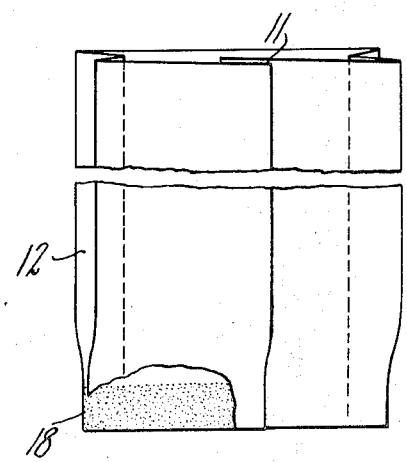
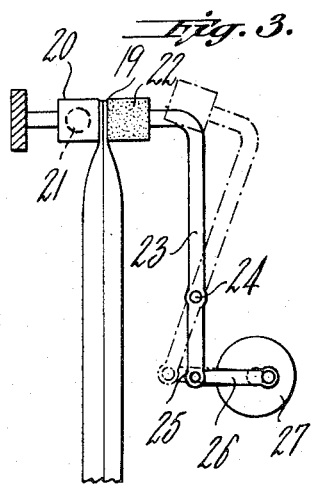
INVENTOR.
HARRY F. WATERS
BY Frank Jooley Jr.
ATTORNEY.

Patented Apr. 22, 1941

2,239,133

UNITED STATES PATENT OFFICE 2,239,133

METHOD FOR FORMING CLOSURES

Harry F. Waters, New York, N. Y.

Application July 2, 1937, Serial No. 151,602

4 Claims. (Cl. 93—35)

My present invention relates to the manufacture of bags or similar containers and, more particularly, the manufacture of a liquid-tight bag provided with a liquid-tight bottom closure and constructed of a material which will permit the formation of a liquid-tight top closure after the bag has been filled with the desired material or liquid.

In the manufacture of liquid-tight bags, considerable difficulty has been encountered in making a sufficiently tight bottom so as to prevent any possibility of leakage through the bottom or the possibility of air entering into the bag and destroying the desirable properties of the ingredients packaged in the bag. Moreover, even should the bottom be made tight, it is usually impractical from a commercial standpoint to provide a top closure therefor which is as liquid-tight as the bottom. Since the presence of even a single small opening or pin-hole in either the bottom or the top closure will render worthless an otherwise satisfactory container, it is necessary not only to provide a bottom and closure construction which is liquid-tight but also to provide a method which will insure the formation of a suitable bottom and closure construction on a commercial scale.

When conventional heat sealing methods and mechanisms are used to form the desired bottom and top closure for bags or other containers made of thermoplastic liquid-proof material, the heat will cause a flow of the thermoplastic material sufficient to cause an adhesion of the walls of the container. However, due to variations in the number of plies in the bottom of a bag, it is extremely difficult to cause a uniform flow of the thermoplastic material so that it is impossible to produce on any quantity basis liquid-tight bags free from small openings. The problem becomes even greater when the bag is provided with gussets because, as will be appreciated, there will be present more layers or plies of material in the bottom, and the thickness of these plies throughout the bag bottom will vary. Moreover, even though the thermoplastic material can be caused to flow by the application of heat thereto, yet, the heat in many instances so affects the material as to render it brittle. Thus, even though a satisfactory bottom may be produced, brittleness of the material may result in the formation of small openings or breaks.

I have found that there are two major factors which prevent the formation of satisfactory bottoms and closures of bags of the type above described. In the first place, in the case of thermoplastic materials, the application of heat merely causes a surface adhesion of the plies of the material forming the bag so that the seam, although when formed perfectly may be liquid-tight, yet the slightest deviation in the flow of the thermoplastic material will cause the formation of small pin-hole openings. In the second place, no attempt is made to retain the normal plasticity of the thermoplastic material. The brittleness caused by the application of heat increases the possibility of the formation of small holes. Further, no attempt is made to insure the application of pressure uniformly throughout the area to be sealed so that if there be any marked variation in the number of plies in the area to which the heat and pressure are applied, that portion containing the smallest number of plies will not receive sufficient pressure to cause a satisfactory adhesion.

Accordingly, it is an object of my present invention to provide in a bag or similar container of the type above described, formed from thermoplastic material, a closure which is formed by a fusion of the material from which the bag is made rather than merely a surface adhesion of the material so that the closure, when formed, constitutes an integral mass of the material from which the bag is made. Moreover, I also contemplate using a thermoplastic material to which has been added a high percentage of plasticising materials as, for example, glycerine, so that even though the heat will lower the plasticity of the thermoplastic material, a sufficient amount of plasticizer will be present which will prevent undue brittleness in the closure.

Another object of my present invention is to provide, in a bag or similar container of the type above described, a closure which constitutes an integral part of the bag itself and which is made by fusing together into an integral mass the layers of material normally occurring as a part of the closure. Still another object of my present invention is to provide an improved form of heat sealing mechanism which will insure the application of sufficient pressure to all parts of the end of the bag, independent of the number of plies which are to be secured together and independent of any variation in the number and/or thickness of the plies throughout the area to which the heat and pressure is applied.

These and other objects of my present invention will become more apparent from a study of the following description when read in connection with the accompanying drawing in which Fig. 1 is a perspective view of a tube made of liquid-proof thermoplastic material from which the bag is formed and provided with gussets of the conventional type;

Fig. 2 is an end elevation showing the tube in position between a pair of heat sealing bars and showing certain details of construction of the backing or pressure bar of the heat sealing device;

Fig. 3 is a side elevation, partially in section, showing the operation of closing the bag after it has been filled and showing, in diagrammatic form, the heat sealing mechanism; and Fig. 4 is an enlarged detail view of the bottom of the bag after it has been formed and showing the fusion of material into an integral mass.

Referring now to the drawing in which like numerals indicate like parts, there is shown one embodiment of my invention. In the drawing, the invention is illustrated as applicable to a gusseted bag although it will be appreciated that the principles of my invention may be used in constructing other forms of bags. In Fig. 1, I have shown a tube 10 made of liquid-proof thermoplastic material and provided with the usual side seam 11 and gussets 12. Since the material used is a thermoplastic material, the seam is formed by applying heat and pressure to the overlapping edges of the web, preferably in accordance with the method disclosed in my Patent No. 2,125,758, dated August 2, 1938, for Machine for manufacturing bags. In forming the bottom, one end of the tube is placed between a bar 13 provided with a heating coil 14 and a backing or pressure bar 15 made of any suitable resilient material, such as rubber. Although it is not necessary that the periphery of the bar 15 be of any particular configuration, since the resiliency of the material from which the bar is made will insure sufficient pressure to be applied at all points, yet for the commercial production of gusseted bags it is desirable to provide the working face of the bar 15 with relieved portions 16 and 17 corresponding to the increased thickness of the seam 11 and gussets 12, respectively. It is also desirable to have the bar 13 present a flat planar surface as shown in Fig. 2 in order to support the unseamed wall of the container in a single plane while the sealing pressure is applied. Suitable heat controlling means (not shown) are used to provide a uniform amount of heat.

Referring now to Fig. 4, there is shown an enlarged detailed view of the bottom of the bag after it has been formed and it will be noted that the end of the bag has been fused into an integral mass 18 and that the gussets, seam and the walls originally present in the end of the tube and discernible in bag bottoms formed by conventional methods are completely obliterated.

After the bag has been filled with the desired liquid, such as oil, the top thereof is closed by a heat sealing method similar to that used in the formation of the bottom. As shown, the top 19 of the bag is placed between relatively movable jaws comprising a stationary bar 20 provided with a heating coil 21 and a movable pressure bar 22 made of some suitable resilient material, such as rubber. The movable pressure bar is suitably connected to one end of a bell crank 23 mounted on pivot 24. The other end 25 of the bell crank is connected in a conventional manner to pitman 26 secured to wheel 27. Rotation of the latter causes the desired reciprocatory movement of the pressure bar. It will, of course, be appreciated that any of the well-known mechanical constructions may be employed to provide for the desired movement of the pressure bar.

Although I have disclosed and described a preferred embodiment of my invention, it will be appreciated that many alterations in details of construction may be made without departing from the spirit or scope of my invention. Similarly, the invention may be applied to all types of bags made of thermoplastic material or made of material carrying a thermoplastic coating without departing from either the spirit or scope of the invention as defined in the appended claims.

I claim:

1. In the manufacture of containers wherein the body portion is formed by overlapping and uniting marginal edges of a sheet of flexible material the process which comprises subjecting one end of said body portion to pressure to seal the same, compensating, during the pressing step, for the seam formed by the overlapped edges of the material, by distributing the pressure applied so that the same pressure is exerted on the area in which the seam is located as is exerted on the remaining portions of the area to be sealed.

2. In the manufacture of containers wherein the body portion is formed by overlapping and uniting marginal edges of a sheet of heat sealing material the process which comprises subjecting one end of said body portion to heat and pressure to seal the same, compensating, during the pressing step, for the seam formed by the overlapped edges of the material, by distributing the pressure applied so that the same pressure is exerted on the area in which the seam is located as is exerted on the remaining portions of the area to be sealed.

3. In the manufacture of containers wherein the body portion is provided with gussets and the said body is formed by overlapping and uniting marginal edges of a sheet of flexible material the process which comprises subjecting one end of said body portion to pressure to seal the same, compensating during the pressing step for the increased thickness of the material to be sealed resulting from the presence of a portion of the seam and portions of the gussets lying within the area to be sealed by distributing the pressure so that the same pressure is exerted on the areas of increased thickness as is exerted on the remaining portions of the area to be sealed.

4. In the manufacture of containers wherein a body portion having opposed walls is formed by overlapping and uniting marginal edges of a sheet of flexible heat-sealing material, the process which comprises supporting in a single plane the end portion of the wall opposite that in which is positioned the seam formed by said overlapped marginal edges, subjecting the end portions of said opposed walls to heat and pressure to seal the end of said container, compensating, during the pressing step for the seam formed by the overlapped edges of the material by distributing the pressure applied so that the same pressure is exerted on the area in which the seam is located as is exerted on the remaining portions of the area to be sealed.

HARRY F. WATERS.